United States Patent [19]

Robinson et al.

[11] 4,415,637
[45] Nov. 15, 1983

[54] CATHODE ELECTRODE STRUCTURES FOR SODIUM SULPHUR CELLS AND THEIR MANUFACTURE

[75] Inventors: Graham Robinson, Tarvin; Raymond O. Ansell, Frodsham; Michael McNamee, Wallasey, all of England

[73] Assignee: Chloride Silent Power Limited, London, England

[21] Appl. No.: 358,417

[22] Filed: Mar. 15, 1982

[30] Foreign Application Priority Data

Mar. 18, 1981 [GB] United Kingdom ............... 8108541

[51] Int. Cl.³ .................................... H01M 4/58
[52] U.S. Cl. ................................ 429/218; 429/104; 429/235; 29/623.5
[58] Field of Search ............... 29/623.5, 623.1–623.4; 429/218, 235, 104

[56] References Cited

U.S. PATENT DOCUMENTS

| | | | |
|---|---|---|---|
| 4,052,535 | 10/1977 | Robinson | 429/104 |
| 4,076,902 | 2/1978 | Senoo | 429/232 X |
| 4,294,005 | 10/1981 | Brennan | 429/104 X |

*Primary Examiner*—Charles F. LeFevour
*Attorney, Agent, or Firm*—Beveridge, DeGrandi & Kline

[57] ABSTRACT

A cathode structure for a sodium sulphur cell is formed of a stack of elements of carbon fibre material or predominantly of carbon fibre material, each element being punched out of a sheet of the material having fibres randomly oriented in planes parallel to the plane of the sheet. For a cylindrical cell, the elements are of annular form with a central aperture.

6 Claims, 3 Drawing Figures

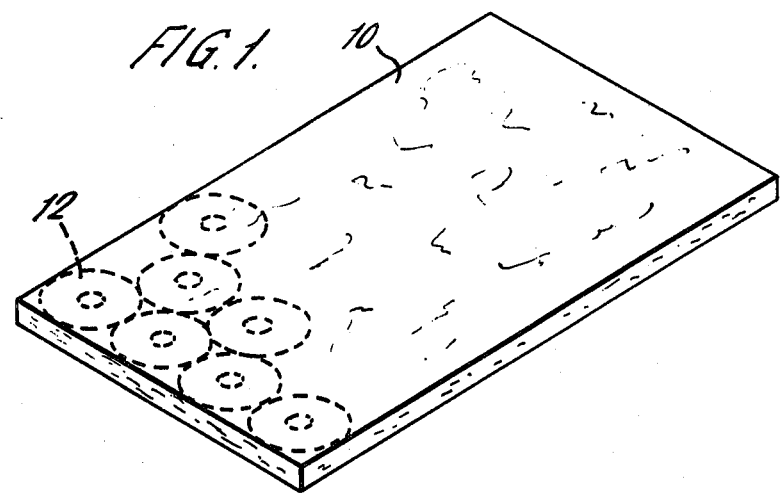
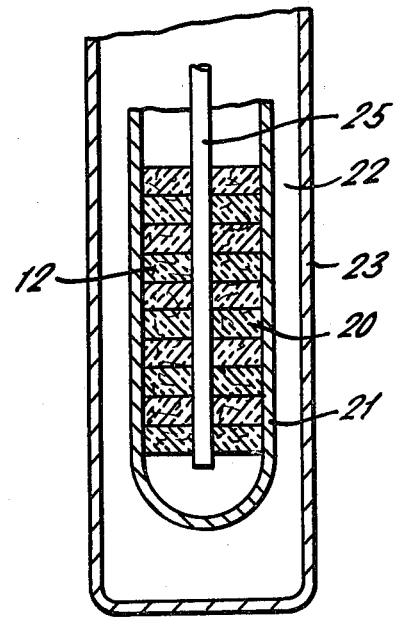
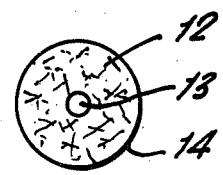

CATHODE ELECTRODE STRUCTURES FOR SODIUM SULPHUR CELLS AND THEIR MANUFACTURE

BACKGROUND OF THE INVENTION

1. Field of the Invention

This invention relates to cathode electrode structures for sodium sulphur cells.

2. Prior Art

In a sodium sulphur cell, a solid electrolyte material, typically beta alumina, separates molten sodium forming the anode from a sulphur/sodium polysulphide cathodic reactant. On discharge of the cell, the sodium gives up electrons at the anodic interface of the solid electrolyte and sodium ions pass through the electrolyte into the cathode adjacent the opposite face of the electrolyte. The electrons pass through the sodium to the anode current collector and thence around an external circuit to a cathode current collector in the cathodic region of the cell. The electrons must pass from this cathode current collector to the region of the cathode adjacent the surface of the solid electrolyte; here they react with the sulphur to form sulphide ions. Sulphide ions and sodium ions form a polysulphide. The electronic conductivity of molten sulphur is low and hence it is the practice to pack the cathodic region with a fibrous carbon or graphite material to provide the required electronic conductivity, the fibrous material forming a matrix through which the cathodic reactant can move.

Sodium sulphur cells are commonly of tubular form and they may be of the kind known as a central sodium cell in which the sodium is inside the electrolyte tube and the cathodic region lies between the outer surface of the electrolyte tube and a tubular current collector, which might constitute or form part of the cell housing. Alternatively the cell may be of the type known as a central sulphur cell in which the sodium is outside the electrolyte tube and the cathodic reactant is in the annular region between the inner surface of the electrolyte tube and the central current collector rod or tube. In each of these constructions, the cathodic region is of annular form. It has been a common practice to use graphite felt as the electronically-conductive packing material in the cathodic region. Such felt may be formed for example into annular elements which may be packed axially into the cathodic region, the felt subsequently being impregnated with sulphur. It is also known for example from U.K. Pat. No. 1,472,975 and U.S. Pat. No. 4,052,535, to fabricate a cathode matrix from preformed elements which have been shaped by compression whilst impregnated with liquid sulphur, the elements being cooled whilst being pressed so that they can be fitted into the annular region of the cell. When the cell is raised to the operating temperature, the sulphur melts and the compressed fibrous material expands to provide good contact with both the current collector and the electrolyte surface.

In U.S. Pat. No. 4,076,902, there is described a sodium sulphur cell in which graphite fibres are arranged in an annular region between a beta alumina electrolyte tube and a surrounding cell housing with the fibres extending in a direction normal to the cathodic current collector constituted by the cell housing and thus normal to the electrolyte tube. It has long been appreciated that radial orientation of the fibres would be desirable to improve the radial conductivity but the above-mentioned U.S. patent specification does not disclose any method by which the graphite fibres can be so oriented. One method of radially orienting fibres is disclosed in U.S. Pat. No. 4,294,005. In this specification there is described a method in which a compressible block of electronically-conductive fibrous materials is formed with the fibres extending predominantly in parallel planes; the block is then cut in a plurality of parallel planes normal to a plane in which the fibres extend to form at least one sheet in which all the fibres have a component of direction normal to the plane of the sheet, the sheet is then compressed along a series of parallel regions which extend across the sheet in its plane to form segments of trapezoidal section between the compressed regions with the fibres having a component of direction normal to the parallel surface of the trapezoids. The fibrous sheet is impregnated either before compression or whilst compressed, with the cathodic reactant at a temperature such that the cathodic reactant is liquid and the compressed impregnated sheet is cooled to solidify the reactant. The segments of trapezoidal form thus form a plurality of segments which may be assembled together, each extending at least part of the lenght of the cell, to form an annular cathode electrode structure.

SUMMARY OF THE INVENTION

It is one of the objects of the present invention to provide a simpler and more convenient method of forming a cathode structure for a sodium sulphur cell with fibres extending in a direction between the electrolyte surface and the current collector, i.e. in a plane normal to the axis of the cell for a cylindrical cell.

According to one aspect of the present invention a method of forming a cathode structure for a sodium sulphur cell comprises the steps of impregnating, with sulphur, a sheet of fibrous electronically conductive material having fibres extending in random directions parallel to the plane of the sheet and punching from the sheet one or more elements each element having an aperture extending through the sheet normal to the plane thereof. For a cylindrical cell the elements are conveniently annular elements with a central circular aperture. The impregnation is effected with liquid sulphur and preferably the impregnated material is allowed to cool so that the sulphur solidifies before the punching operation is carried out.

The sheet typically comprises carbon or graphite fibre material and would generally be predominantly of such material.

The invention includes within its scope a cathode structure for a sodium sulphur cell comprising annular elements formed by the above-described method.

A method described above enables annular elements of exactly predetermined size to be formed each element comprising a sheet of electronically-conductive fibrous material impregnated with sulphur. The solid sulphur holds the fibrous material rigid and hence such elements can be made exactly to a predetermined size.

However, it may be preferred to make the rings slightly oversize and then to compress them in a mould, while the sulphur is hot, allowing them to cool in the compressed state. Such rings can be put in a cell and, when brought up to the operating temperature, the sulphur will melt, allowing the rings to expand so ensuring good contact with the electrolyte and current collector.

According to another aspect of the invention, a cathode structure for a sodium sulphur cell comprises a plurality of elements punched from a sheet or sheets of sulphur-impregnated electronically-conductive fibre material having the fibres lying in random directions in planes normal to the axis of the element, each element having an aperture extending through the sheet normal to the plane thereof.

In assembling a sodium sulphur cell, such elements may be put into an annular region between a cathode current collector and an electrolyte tube. The cell may be of the central sodium type, in which case the elements would be around the outside of the electrolyte tube between that tube and a surrounding current collector, which is typically the housing of the cell. Very conveniently however this type of element is used for a central sulphur type of cell since there is then much less waste of fibre material in the punching operation compared with elements for a central sodium cell in which the central hole has to be much larger for a given size cell. In a central sulphur cell, the elements are put in the annular region between a central current collector, typically a rod or tube extending coaxially within an electrolyte tube. The elements may be threaded onto the current collector before the latter is assembled in the cell.

The elements, which, as described above, may be formed wholly of or predominantly of carbon or graphite fibre material, would usually be closely adjacent to one another in the cell.

BRIEF DESCRIPTION OF THE DRAWINGS

FIG. 1 is a perspective view of a sheet of fibrous material illustrating how it is to be divided up into individual elements;

FIG. 2 is a plan view of an element punched from the sheet of FIG. 1; and

FIG. 3 illustrates a sodium sulphur cell incorporating the elements to form the cathode structure.

DESCRIPTION OF PREFERRED EMBODIMENTS

Referring to FIG. 1 there is shown a sheet 10 of fibrous material in which the fibres lie parallel to the plane of the sheet, extending in random directions in the plane in which they lie. Fibrous material of this nature, formed of mesophase pitch-based carbon fibre material is commercially available in thin sheets. The thickness of the sheet is not critical provided that the required elements can be formed from it by a punching operation in the manner to be described. Each element 12 to be formed is of annular form as shown in FIG. 2 and has a central hole 13 and an outer concentric periphery 14. The sheet 10 is impregnated with molten sulphur and, after the sulphur has cooled and solidified, a plurality of elements, as indicated by the dashed lines in FIG. 1, are punched from this sheet. The punching operation may be carried out in two stages, punching out the central apertures first and then punching out the annular element, or it may be carried out as a single stage operation.

The elements thus formed may be assembled into a sodium sulphur cell as shown in FIG. 3. In this particular cell, which is of the central sulphur type, that is to say having the sulphur in the cathodic region 20 within a tube 21 of electrolyte material, e.g. beta alumina, and having sodium in an annular region 22 between the outside of the electrolyte tube and a housing 23, the annular elements 12 are assembled on a cathode current collector rod or tube 25 which is located axially within the cathodic region. These elements 12 are put on the rod or tube 25 closely adjacent to one another. They are dimensioned so that they fit closely in contact with the current collector rod or tube 25 and also fit tightly within the internal diameter of the electrolyte tube 21 so as to be in close contact therewith. The sulphur impregnation of the sheet 10 conveniently is effected with the sheet compressed. When the elements are in the cell and the cell is heated, the sulphur melts and the compressed fibrous material will expand slightly to ensure good contact.

The invention can be applied to the construction of a sodium sulphur cell of the central sodium type; in this case the elements are formed with a central aperture of such size that they fit closely around the electrolyte tube when the elements are assembled in the cell and extend radially outwardly to the cathode current collector, which typically might be the housing of the cell.

Although a cylindrical cell with a central or concentric cylindrical current collector has been more particularly described, it will be understood that the cathode elements may readily be shaped to suit other cell geometries.

We claim:

1. A method of forming a cathode structure for a sodium sulphur cell comprising the steps of impregnating, with sulphur, a sheet of fibrous electronically-conductive material having fibres extending in random directions parallel to the plane of the sheet and punching from the sheet one or more elements each element having an aperture extending through the sheet normal to the plane thereof.

2. A method as claimed in claim 1 wherein the impregnated material is allowed to cool after impregnation with liquid sulphur so that the sulphur solidifies before the punching operation is carried out.

3. A method as claimed in claim 1 wherein the sheet comprises carbon or graphite fibre material.

4. A method as claimed in claim 1 wherein the sheet comprises predominantly carbon or graphite fibre material.

5. A method as claimed in claim 1 wherein each element is annular with a central circular aperture.

6. A cathode structure for a sodium sulphur cell comprising a plurality of elements formed by the method of claim 1.

* * * * *